(12) United States Patent
Karapantelakis et al.

(10) Patent No.: US 11,836,934 B2
(45) Date of Patent: Dec. 5, 2023

(54) DISTRIBUTED COMPUTATION FOR REAL-TIME OBJECT DETECTION AND TRACKING

(71) Applicant: Telefonaktiebolaget LM Ericsson (publ), Stockholm (SE)

(72) Inventors: Athanasios Karapantelakis, Solna (SE); Volodya Grancharov, Solna (SE); Sigurdur Sverrisson, Kungsängen (SE); Maxim Teslenko, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 17/298,774

(22) PCT Filed: Dec. 3, 2018

(86) PCT No.: PCT/EP2018/083273
§ 371 (c)(1),
(2) Date: Jun. 1, 2021

(87) PCT Pub. No.: WO2020/114570
PCT Pub. Date: Jun. 11, 2020

(65) Prior Publication Data
US 2022/0058813 A1 Feb. 24, 2022

(51) Int. Cl.
*G06T 7/246* (2017.01)
*G06V 20/40* (2022.01)

(52) U.S. Cl.
CPC .............. *G06T 7/248* (2017.01); *G06V 20/40* (2022.01); *G06T 2207/10016* (2013.01)

(58) Field of Classification Search
None
See application file for complete search history.

(56) References Cited

U.S. PATENT DOCUMENTS 7,450,735 B1 * 11/2008 Shah ...................... G06T 7/292
348/169
9,443,320 B1 9/2016 Gaidon et al.
(Continued)

FOREIGN PATENT DOCUMENTS

| CN | 103413295 A | 11/2013 |
| CN | 106797451 A | 5/2017 |
| WO | 2020001759 A1 | 1/2020 |

OTHER PUBLICATIONS

Apte, Maneesh, et al., "YOLO Net on iOS", Technical Report for Course CS231n: Convolutional Neural Networks for Visual Recognition, http://cs231n.stanford.edu/reports/2017/pdfs/135.pdf, 2017, 1-8.
(Continued)

*Primary Examiner* — Vikkram Bali
(74) *Attorney, Agent, or Firm* — Murphy, Bilak & Homiller, PLLC

(57) ABSTRACT

Techniques for distributed object detection and tracking are described. In an example method, a first current frame from a series of frames is sent to a first node, for detection of a first object. After object detection information for the first object is received in return, a second node is selected, and a second current frame is sent to the second node for an updated object detection. In addition, while waiting for the results of the updated object detection, two or more frames following the second current frame are sent to respective tracking nodes. Object modelling information indicating location and/or classification of one or more objects, as derived from the previously received object detection information is also sent to each of the respective tracking nodes. Tracking information for the first object is received from each of the respective tracking nodes.

20 Claims, 8 Drawing Sheets

(56) References Cited

U.S. PATENT DOCUMENTS

2010/0208941 A1* 8/2010 Broaddus ......... G08B 13/19645
382/103
2017/0206669 A1* 7/2017 Saleemi ................ G06T 11/206

OTHER PUBLICATIONS

Dautov, Rustem, et al., "Data Processing in Cyber-Physical-Social Systems Through Edge Computing", Digital Object Identifier, vol. 6, IEEE Access, 2018, 29822-29835.

Fredrich, Cecilia Maria Buarque, et al., "A Parallel Method for Object Tracking", IWSSIP 2010—17th International Conference on Systems, Signals and Image Processing, 2010, 1-4.

Jang, Si Young, et al., "Application-aware IoT Camera Virtualization for Video Analytics Edge Computing", 2018 Third ACM/IEEE Symposium on Edge Computing, 2018, 132-144.

Nikouei, Seyed Yahya, "Real-Time Human Detection as an Edge Service Enabled by a Lightweight CNN", accessed from https://arxiv.org/abs/1805.00330v1 on Apr. 24, 2018, 2018, 1-5.

Pena, Dexmont, et al., "Benchmarking of CNNs for Low-Cost, Low-Power Robotics Applications", RSS 2017 Workshop: New Frontier for Deep Learning in Robotics, 2017, 1-5.

Possegger, Horst, et al., "Robust Real-Time Tracking of Multiple Objects by Volumetric Mass Densities", 2013 IEEE Conference on Computer Vision and Pattern Recognition, Portland, Oregon, 2013, 2395-2402.

Redmon, Joseph, et al., "YOLO9000: Better, Faster, Stronger", Computing Research Repository (CoRR), abs/1612.08242, 2016, 7263-7271.

Vasudevan, Sudarshan, et al., "Leader Election Algorithms for Wireless Ad Hoc Networks", Proceedings of the DARPA Information Survivability Conference and Exposition (DISCEX'03), IEEE Computer Society, 2003, 1-12.

Verbelen, Tim, "Leveraging Cloudlets for Immersive Collaborative Applications", Pervasive Computing, IEEE CS, Oct.-Dec. 2013, 30-38.

Wedge, Daniel, et al., "Object Tracking over Multiple Uncalibrated Cameras Using Visual, Spatial and Temporal Similarities", ACIVS 2010, Part II, LNCS 6475, Springer-Verlag Berlin Heidelberg, 2010, 167-178.

* cited by examiner (a)

(b)

(c)

(d)

DISTRIBUTED COMPUTATION FOR REAL-TIME OBJECT DETECTION AND TRACKING

TECHNICAL FIELD

The present disclosure relates to object detection and tracking in video data.

BACKGROUND

Object detection and tracking in video data is part of the technology baseline for many contemporary applications and services, including autonomous driving, remote robotic surgery, population counting, product identification, anomaly detection, etc. In a typical setup, such technology is deployed either as an embedded solution, e.g., within a device such as a vehicle, or as a client-server application, e.g., with a client such as a mobile device sending raw data such as images of video frames to a cloud datacenter that subsequently performs the object detection. The best-performing solutions for object detection are based on convolutional neural networks (CNNs), which are computationally intensive.

The fastest of CNN-based visual object detection platforms (e.g. Darknet, TensorFlow) can run reasonably-sized, general-purpose CNNs (e.g. Yolo, Faster R-CNN) in real-time on some hardware systems, such as desktop computers with powerful processors such as the NVIDIA Titan X graphics processing unit (GPU). However, despite continuing and rapid improvements in mobile devices' capabilities, object detection is still a very difficult task to perform in smart phones, tablets, or other small-form-factor computers embedded in devices at the network edge (e.g. in robots, drones, sensors, etc.).

Indeed, running algorithms with the complexity of modern visual object detectors on battery-powered devices will likely remain a challenge in the foreseeable future, especially for devices that do not contain powerful GPUs, central processing units (CPUs), or tensor processing units (TPUs), but that are instead based on relatively inexpensive, standard, power-conscious CPUs or off-the-shelf microcontrollers.

SUMMARY

Several of the techniques, devices, and systems described herein address this problem by utilizing distributed computation for performing object detection and/or object tracking, where the detection and/or tracking is performed by several nodes, e.g., several nodes in an ad hoc network. This distribution of computation is opportunistic, ad-hoc and may take the computational capabilities of specific devices into account.

These techniques may be of specific interest in resource constrained environments, where devices form dynamic ad-hoc networks and have resource constraints in terms of battery power and/or computational capabilities. The disclosed techniques allow for the power consumed for the object detection and tracking functions to be distributed between multiple devices in this case.

Specific techniques for distributed object detection and tracking are detailed below. According to several of these techniques, a first current frame from a series of frames is sent to a first node, for detection of a first object. After object detection information classifying and/or locating the first object in the first current frame is received in return, a second node is selected, and a second current frame is sent to the second node for an updated object detection. In addition, while waiting for the results of the updated object detection, two or more frames following the second current frame are sent to respective tracking nodes. Object modelling information indicating location and/or classification of one or more objects, as derived from the previously received object detection information, is also sent to each of the respective tracking nodes. Tracking information for the first object is received from each of the respective tracking nodes.

The techniques described in detail below include an example method for tracking a location of an object in a series of frames of a video stream, where the method includes a step of selecting, from a set of two or more nodes available for object detection, a first node, and sending a first current frame from the series of frames to the first node, for detection of a first object in the frame. The method continues with the step of receiving, from the first node, object detection information for the first object. The method continues, after this receiving of the object detection information for the first object from the first node, with several additional steps. First, a second node is selected, from the set of two or more nodes available for object detection, and a second current frame from the series of frames is sent to the second node, for an updated detection of the first object. In addition, each of two or more frames following the second current frame are sent to respective tracking nodes, where sending each frame to a respective tracking node includes the selection of the respective tracking node from a set of two or more nodes available for tracking. Object modelling information derived from the object detection information is also sent to each of the respective tracking nodes—this may be sent along with the frames sent to the tracking nodes, or may be separately provided to all of the available tracking nodes, in various embodiments. Finally, tracking information for the first object for the frame sent to each of the tracking nodes is received from the respective tracking nodes.

The method described above may be repeated one or more times. Thus, in some embodiments, the example method described above may further include the steps of receiving updated object detection information for the first object, from the second node, selecting, from the set of two or more nodes available for object detection, a third node, and sending a third current frame from the series of frames to the third node, for further updated detection of the first object. The method may still further include the steps of sending each of two or more frames following the second current frame to respective tracking nodes, wherein sending each frame to a respective tracking node comprises selecting the respective tracking node from a set of two or more nodes available for tracking, sending updated object modelling information derived from the updated object detection information to each of the respective tracking nodes, and receiving, from each of the respective tracking nodes, tracking information for the first object for the frame sent to the respective tracking node. It will be appreciated that this technique may be repeated until, for example, tracking of the object is no longer required or is no longer possible.

Devices and systems corresponding to the above methods, and variants thereof, are also described in detail in the discussion that follows.

The disclosed techniques, devices, and systems may provide several advantages, at least in some embodiments. As a general matter, for example, these techniques do not require connection to a centralized datacenter, meaning that it is possible for detection to happen among devices in close proximity, even where conventional network connectivity (e.g., IEEE 802.11x or cellular networks) is unavailable. Low-power, short-range network protocols, such as Bluetooth or IEEE 802.15.4-based network stacks (XBee, 6LowPAN, etc.) can be used instead. Another advantage is that these techniques can function in resource-constrained environments, where the computational performance of devices is low and/or where device power consumption is limited. Some embodiments of these techniques can be deployed using existing technologies and standards.

The techniques, devices, and systems disclosed herein are not limited to those summarized above. Variations of these, as well as additional advantages and uses of these techniques are described below.

BRIEF DESCRIPTION OF THE FIGURES

The embodiments, together with further objects and advantages thereof, may best be understood by making reference to the following description taken together with the accompanying drawings, in which.

DETAILED DESCRIPTION

Over the coming years, it may be expected that mobile devices may be able to run increasingly accurate object detection algorithms. However, as noted above, running algorithms with the complexity of modern visual object detectors on battery-powered devices will remain a challenge in the foreseeable future, especially for devices that do not contain powerful GPUs, CPUs, or TPUs.

At the same time, object tracking, as opposed to object detection, may be feasible on a wide variety of devices, because the complexity of object tracking is less than that of objection detection.

One possible alternative to the client-server model, in which object detection and tracking tasks are performed by a server, is a hybrid solution that uses a combination of server-based object detection and client-based object tracking to offer an object detection solution that is more accurate than simple object tracking, but that does not require a computationally-expensive object detector running on the client. However, this approach still requires access to a server.

Several of the techniques, devices, and systems described herein address this problem by utilizing distributed computation for performing object detection and/or object tracking, where the detection and/or tracking is performed by several nodes, e.g., several nodes in an ad hoc network. This distribution of computation is opportunistic, ad-hoc and may take the computational capabilities of specific devices into account.

These techniques may be of specific interest in resource constrained environments, where devices form dynamic ad-hoc networks and have resource constraints in terms of battery power and/or computational capabilities. The disclosed techniques allow for the power consumed for the object detection and tracking functions to be distributed between multiple devices in this case.

Use cases that may map particularly well to these techniques might include, for example:
  multiple drones flying over the same industrial object (or on a rescue mission), where their task requires object detection.
  a group of field engineers in a factory (or in a pipeline, or working on an electrical grid, etc.), with mobile phones that need visual object detection for an Augmented Reality support application.
  multiple devices operating in remote environments such as mines, war zones, or the like, where a connection to a server is not available or is very expensive.

The techniques described herein are suitable for implementation in a network made up of a number of nodes. The nodes are interconnected and reachable in a network that can be an infrastructure network, or a mesh or ad-hoc network created dynamically, or in some combination of both.

Figure 1:
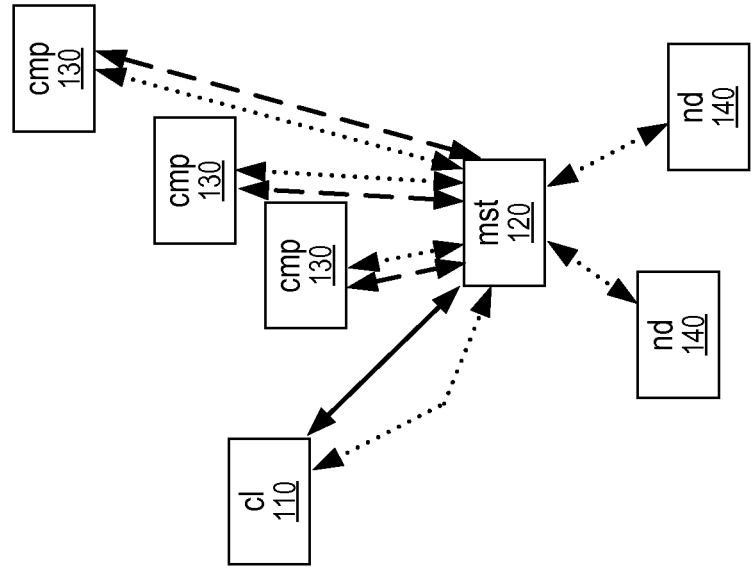
FIG. 1 illustrates example configurations of nodes and roles according to some of the disclosed embodiments.
Figure 1:
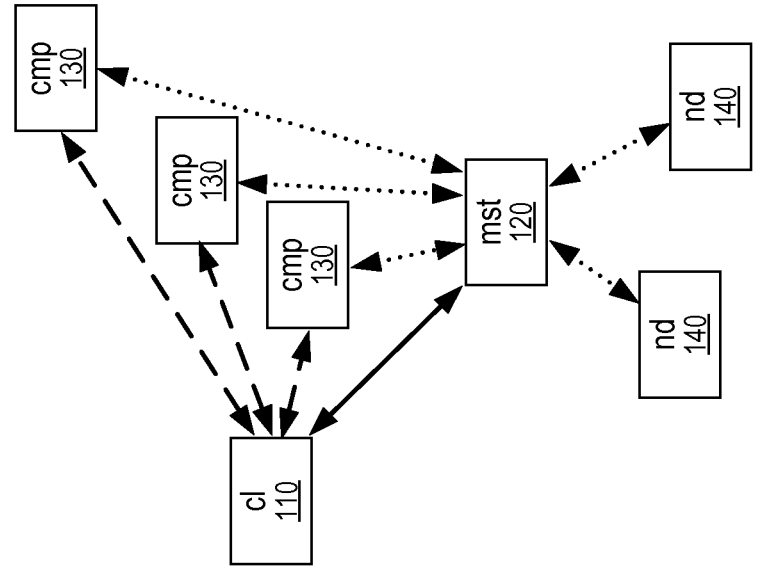
Figure 1:

FIG. 1 illustrates two example configurations for an object detection and/or tracking system that may utilize the presently disclosed techniques. The illustrated nodes, which include client ("cl") nodes 110, compute ("cmp") nodes 130, master ("mst") nodes 120, and generic ("nd") nodes 140, should be understood as logical nodes, or "roles," in that a given device may act according to different ones of these roles at different times and, in some cases, as explained further below, may act according to two roles at once. That said, it should be appreciated that each of the illustrated compute nodes 130 and generic nodes 140 will generally correspond to a distinct device, connected to the other devices via an ad hoc or conventional network.

During an object detection and/or tracking session, the nodes illustrated in FIG. 1 perform the roles described below.

Client ("cl") role: This role is performed by the node requesting the performance of object detection and/or object tracking tasks. This node, illustrated as cl node 110 in FIG. 1, is responsible for supplying raw input material to compute ("cmp") nodes 130, whether directly, as in configuration (a) of FIG. 1, or via the master ("mst") node 120, as in configuration (b) of FIG. 1. Raw input material includes image data or video data encoded in some format, such as JPEG, PNG, BMP, TIFF, GIF in the case of images and MPEG-4, H.264, H.265 in the case of video.

Compute ("cmp") role: A node having this role performs object detection and/or object tracking tasks, according to assignments received from a master ("mst") node 120. This node, illustrated as cmp node 130 in FIG. 1, accepts raw input material in the form of picture frames (either images or video from where image frames are extracted), and outputs classes of detected objects and their position on the frame. The object detection service rendered by a cmp node 130 is considered stateless, in that it requires no storage—the necessary raw input material for providing a task is provided along with the assignment of the task. Specific examples of an object detection task are provided below.

Master ("mst") role: A node with master role is responsible for assigning compute roles to compute ("cmp") nodes. An example is illustrated in FIG. 1 as mst node 120. These assignments are dynamic, i.e. an mst node 120 can reassign compute roles, e.g., based on current cmp node performance or if a cmp node 130 leaves the network. Optionally, the mst node 120 can function as an endpoint for raw data traffic from the client ("cl") node 110, as in configuration (b) of FIG. 1. In this case mst node 120 accepts all images or video frames from the cl node 110 and selects cmp nodes to forward them to. In such a scenario, the mst node can also be seen as performing a load balancing task, while also striving to provide high availability of appropriate computation power via the cmp node s 130.

The "nd" role: This node is shown in FIG. 1 as nd node 140, for the sake of completeness, and performs a generic role corresponding to nodes that are not actively performing object detection and/or object tracking services but are in proximity to and visible to other nodes.

These nodes do not qualify as mst and/or are not selected by the mst to serve as cmp nodes.

As noted above, the roles are logical. One physical device may transition from one of the illustrated roles to another, e.g., from "cmp" to "nd," or vice-versa. It is also possible for a physical node to have both mst and cmp roles, for example. Still further, a physical node may support multiple object detection sessions, in some embodiments, for example being a client (cl) for one and a master (mst) and/or compute (cmp) for another session.

In FIG. 1, configuration (a) may be understood as an embodiment in which the mst node 120 acts as a computation coordinator, while configuration (b) illustrates an embodiment in which the mst node 120 acts as a computation endpoint. As seen in the figure, this means that the raw data and the objection detection/tracking results pass directly between the cl node 110 and the cmp nodes 130 in the former configuration, while both pass through the mst node 120 in the latter. As can be seen in the figure, in configuration (a), mst node 120 selects cmp nodes 130 ("node election" or "node selection") and manages the cmp nodes 130 but does not handle the raw data and the object detection/tracking results. In configuration (b), on the other hand, everything passes through the mst node 120, such that cl node 110 need not communicate directly with cmp nodes 130 at all.

Figure 2:
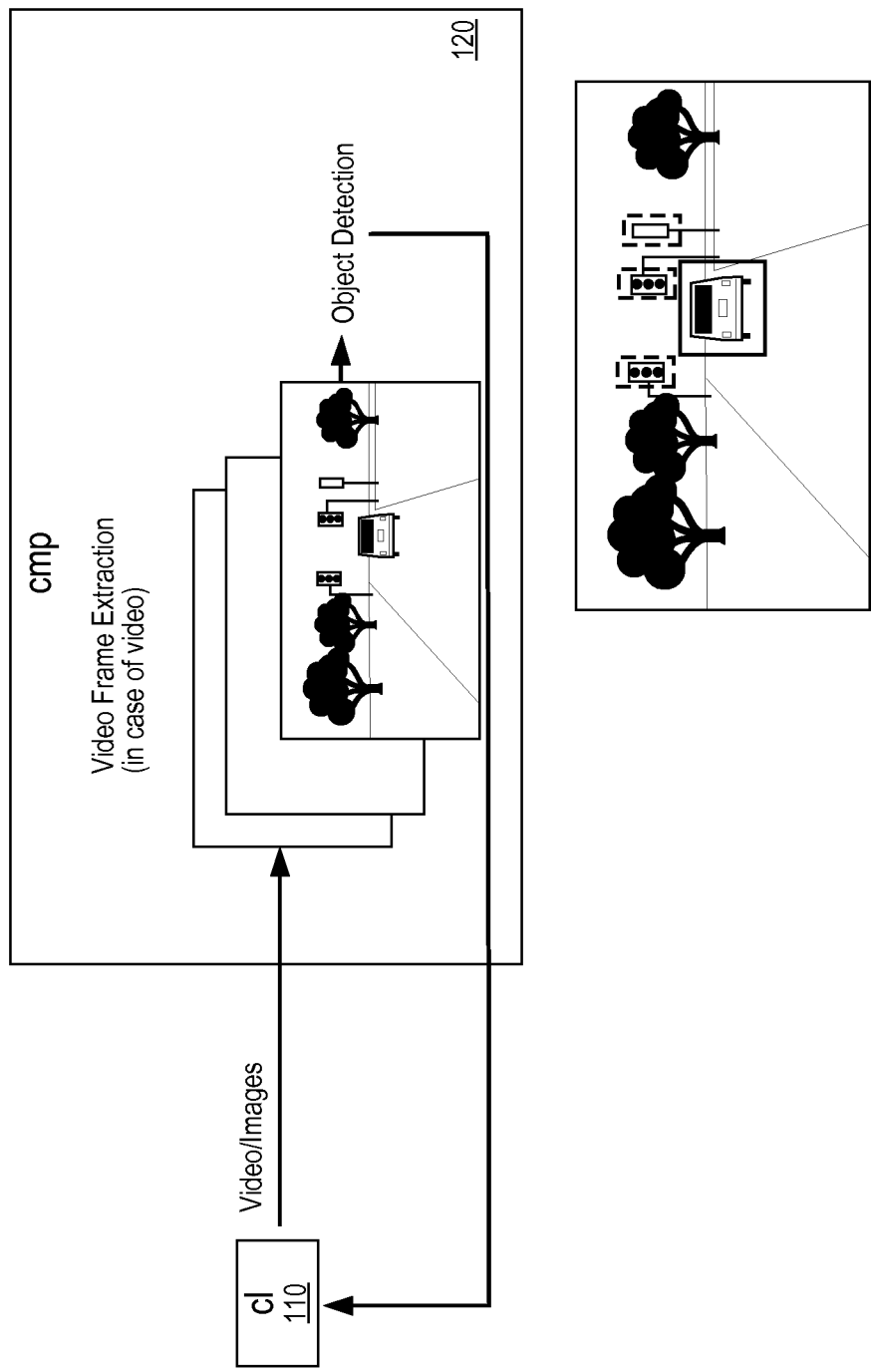
FIG. 2 shows an example of interactions between a client node and a compute node.

FIG. 2 shows an example of the interaction between the cl node 110 and cmp nodes 130. As seen in the figure, cl node 110 sends raw input material to the cmp node 130, either directly, per instructions from an mst node 120 acting as a coordinator, or via a mst node 120 acting as a computation endpoint, as in configurations (a) and (b) of FIG. 1, respectively. For an object detection task, cmp node 130 extracts frames from this raw material, in the case of video data, and detects one or more objects in the frames, returning object detection information to the cl node, again directly, or via the mst node 120, the object detection information comprising an identification of one or more objects, e.g., according to an object class, and information indicating the location or locations of the objects in each of the frames. In the illustrated example, the object detection information returned to the cl node 110 is serialized in a JSON representation. Other formats or representations of the object detection information are possible, however. For example, the object detection information may comprise images or video with object identifying information superimposed on the images or video, as shown in the lower-right of FIG. 2. The detected objects are sent back to the cl node 110 frame by frame, in instances where multiple frames are assigned to a cmp node 130 for a given object detection task. Example code for the detected objects may include:

```
{
    "framedID":5,
    "detectedObject0":{
        "class":"car",
        "bbox":["224","83","320","140"]
    }
    "detectedObject1":{
        "class":"trafficLight",
        "bbox":["194","27","213","48"]
    }
    "detectedObject2":{
        "class":"trafficLight",
        "bbox":["313","31","331","51"]
    }
    "detectedObject3":{
        "class":"trafficLight",
        "bbox":["344","9","363","31"]
    }
}
```

In addition to the roles, every physical node in a network may be assumed to have some basic properties. First, each physical node has an identifier, such as a Media Access Control (MAC) address corresponding to the physical node's wireless network interface. This identifier can be communicated to other nodes on request and is used when selecting a mst or cmp node. Second, each physical node has some storage in which it stores information corresponding to other physical nodes in the network. For instance, a reputation score or scores may be stored for other nodes, for use in selecting the best available cmp nodes or mst nodes, with these reputation scores reflecting the nodes' performances as mst nodes or cmp nodes in previous object detection sessions.

In some embodiments, the mst role may be assigned to a node in a network by voting, e.g., based on reputation of the nodes in the network, or at random, or it can be preselected/hardcoded by the implementor of the distributed object detection/tracking system. In some embodiments, the mst node 120 may also be able to delegate responsibility in such a way that it effectively switches processing models, from that of distributed computation for both object detection and object tracking, as described herein, to a conventional client-server mode, or to a client-server mode where the object detection is performed by a server or servers while object tracking is performed by the cl node 110 and/or by cmp nodes 130 in a distributed fashion. With this approach, for example, if the set of drones described above suddenly get access to such computational resources, each drone can update a "resource table" maintained by the drone with an entry corresponding to the now available server or servers, in addition to other entries corresponding to cmp nodes 130 accessible to the drone, where this new entry reflects the higher computational and power resources of the server or servers, relative to the other cmp nodes 130 in the ad-hoc network of drones. Then, if connection to that server is subsequently lost, all drones may update their "resource tables" by removing that entry, leaving only entries for other available cmp nodes 130 in the network.

In some embodiments, two or more types of reputations are stored as value pairs by nodes in the network, as described in further detail below, with these being used to select a master node for a given session and to select compute nodes for carrying out object detection and/or object tracking tasks during the session.

First, an <identifier, mst_reputation_index> value pair for each of several physical nodes holds the reputations of other physical nodes in the network with respect to the role of mst (master). The identifier value represents a unique identifier for a given physical node, such as a MAC address. The mst_reputation_index value reflects that node's performance as a mst node 120 in previous object detection sessions.

An example way to calculate mst_reputation_index for an identifier (or mathematically $mst\_rep_{identifier}$) could be the following:

Let $mst\_dsr_{identifier}$ be the ratio of completed object detection and/or tracking sessions to total object detection and/or sessions the node participated in as the mst node 120. (This will be less than 1, in the event that a node acting as a mst node 120 left the network before the cl node 110 closed/completed the object detection and/or tracking session, for example).

Let $mst\_cmpreselect_{identifier}$ be the ratio of initial cmp appointments made by the node acting as mst to cmp reselections that had to be made (This will be less than 1 in the event that a cmp node selected by the node acting as mst left the network before the cl node 110 closed/completed the object detection session.)

Let mst_battery_remaining be a normalized 0 to 1 value of remaining battery on the node (e.g., where a value of "1.00" indicates a full battery while values close to 0 indicate an imminent shutdown).

Then, the reputation index for the node, with respect to its performance as a mst node 120, could be a weighted average, as follows, where the higher the value the better:

$$mst\_rep_{identifier} = (mst\_dsr_{identifier} \cdot w1 + mst\_cmpreselect_{identifier} \cdot w2) * mst\_battery\_remaining_{identifier}$$

The reputation index for mst nodes 120 may be computed and updated on cl nodes 110, e.g., with each cl node 110 sending keep-alive messages to the mst node 120 in order to find out if this node is still alive. In addition, when a mst node 120 makes a reselection of a cmp node 130, it may inform the cl node 110 about it, so that the index may be updated.

A similar <identifier, cmp_reputation_index> value pair may be used to store the reputation of each of the other physical nodes in the network with respect to their performances in the role of cmp (compute) node. The identifier value again represents a unique identifier for a given physical node, such as a MAC address. The cmp_reputation_index value reflects that node's performance as a cmp node 130 in previous object detection sessions.

As with the mst_reputation_index value discussed above, the cmp_reputation_index value can be calculated to give an indication of the reputation of a physical node with a given identifier in the role of cmp node 130 ($cmp\_rep_{identifier}$). Examples of variables contributing to the calculation of $cmp\_rep_{identifier}$ could be the ratio of completed to total object detection sessions the node participated in, as a cmp node 130. In addition, $cmp\_per_{identifier}$ could be an indication of the performance of the physical node as a cmp node 130 in terms of frames processed versus total number of frames sent to the cmp node 130. Again, the same weighted average approach could be used to calculate a reputation index. The same battery remaining parameter can be used here as well. In some embodiments, a single cmp_reputation_index may be computed and stored for each of several physical nodes in the network, corresponding to all of the compute tasks the physical node performs. In others, separate scores may be computed for different types of compute tasks, such as separate scores for object detection and object tracking tasks.

The performance of a cmp node 130 may be identified by the physical node having mst role in some embodiments (e.g., in a scenario where the mst node 120 functions as an endpoint for computations, as shown in FIG. 1b) or by the physical node that has the cl role (e.g., in a scenario where the mst node 120 functions as a computation coordinator as shown in FIG. 1a).

Figure 3:
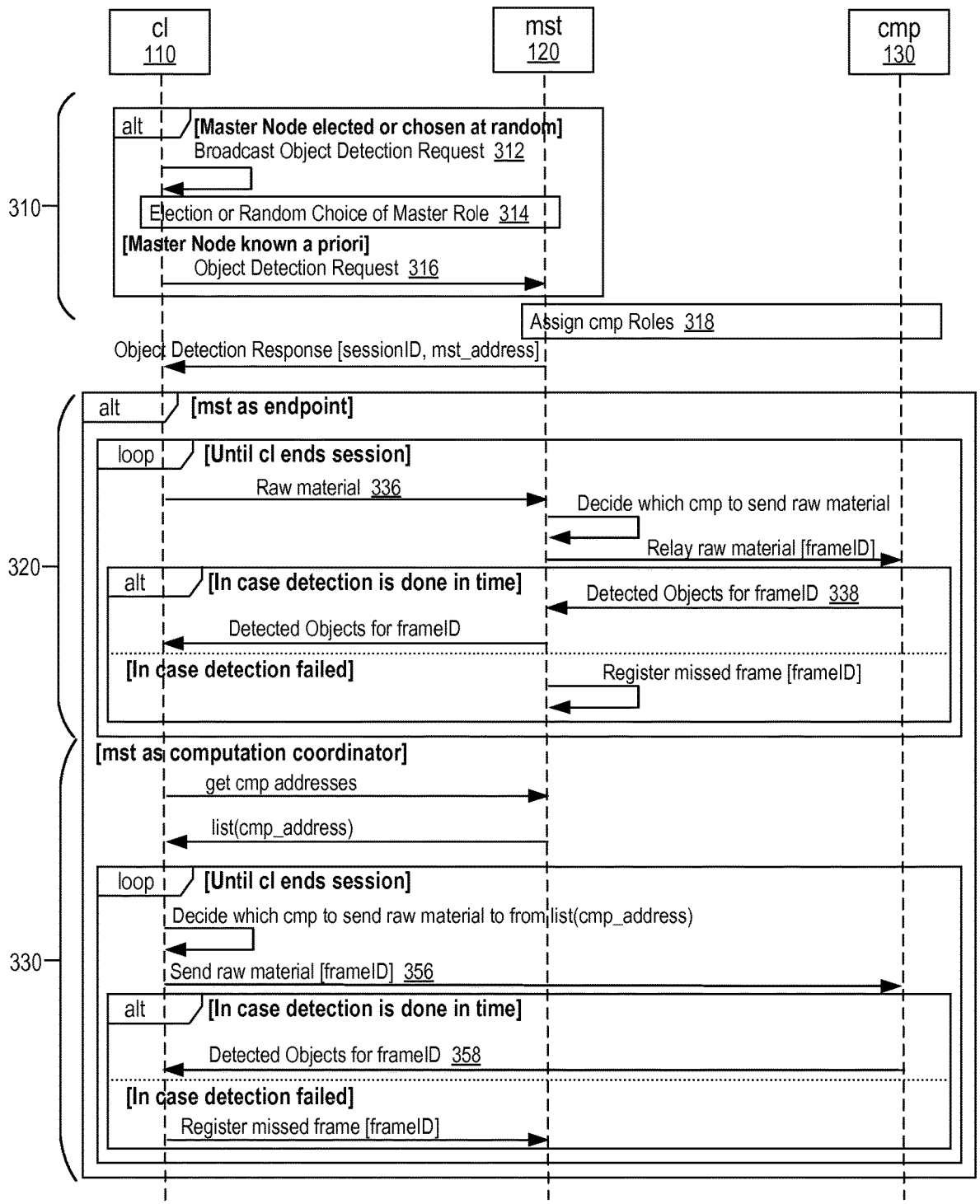
FIG. 3 is a signaling flow diagram according to some embodiments of the presently disclosed techniques.

FIG. 3 illustrates two versions of an example object detection process according to some of the techniques disclosed herein, with a first version corresponding to a configuration where the mst node 120 operates as an endpoint and a second version corresponding to a configuration where the mst node 120 acts as a computation coordinator. The signaling designated as 310 may be present in either version, while signaling 330 and 350 correspond to the "mst as endpoint" and "mst as computation coordinator" scenarios, respectively.

The object detection process is triggered by request of a client (cl), which may begin the process by electing an mst node 120 or choosing one at random, from available nodes. Alternatively, the mst node 120 may be known a priori, in some embodiments, rather than being chosen dynamically.

In the event that the mst node 120 is selected dynamically, the process may begin, as shown in FIG. 3, with the broadcasting of a request for object detection, as shown at 312.

This broadcast may use any of various broadcast or flooding techniques for distributing the broadcasted request among nodes of a mesh or ad hoc network, for example. The broadcasted request may include specific requirements for the service such as what type of format used for the raw material. This can be encapsulated—for example—by use of MIME types (or media types as they are also known). Here is an example illustrating how an MPEG-4 video stream could look like, encapsulated in an exemplary JSON object:

{
  "mtype":"video/mp4"
}

In the event of images, rather than video, the following might be used:

{
  "mtype":"image/jpeg"
}

Among the nodes receiving the broadcasted request, a selection process, often referred to as an "election" process, may be carried out, as shown in FIG. 3 at 314. This can be done, for example using any of the leader election algorithms that are well known for use in distributed systems in general and for wireless networks, in particular. Some of these are described, for example, in S. Vasudevan, B. DeCleene, N. Immerman, J. Kurose and D. Towsley, "Leader election algorithms for wireless ad hoc networks," Proceedings DARPA Information Survivability Conference and Exposition, 2003, pp. 261-272 vol. 1.

A common aspect among leader election algorithms is the weight, which is an internal variable that contains the current value of the criterion used to elect leaders among nodes. The "weight" in some embodiments of the presently disclosed system may be based on the "reputation index" discussed above. Another common aspect of leader election is the identity of a node, as each node in the network has a unique identity which it can provide on request. In embodiments of the presently disclosed system, this identity can be, for example, the MAC address of the wireless network interface of the device.

An alternative to the use of a leader election algorithm is a simple random selection by the cl node 110. Another alternative is that the mst role has been assigned a priori, with the cl node 110 having previously been told of this assignment. This alternative is shown in FIG. 3 at 316—in this case, the cl node 110 simply contacts the mst node 120 directly, to initiate the object detection process.

Figure 4:
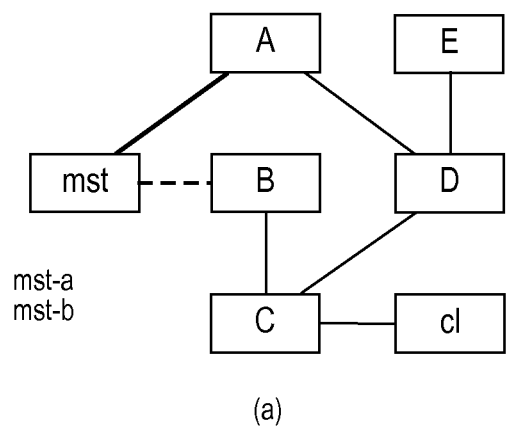
FIG. 4 illustrates an example of identifying candidate nodes, according to some embodiments.
Figure 4:
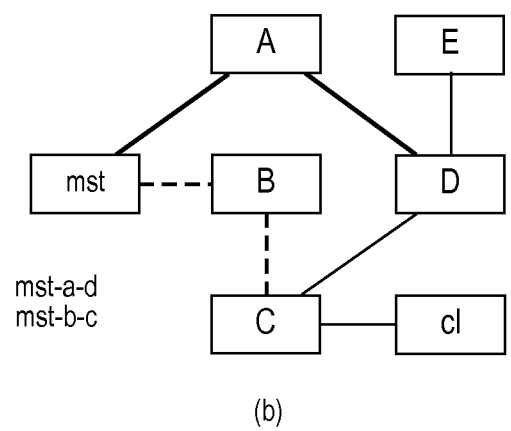
Figure 4:
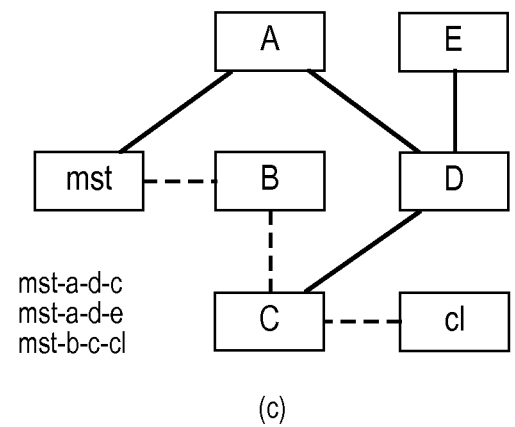
Figure 4:
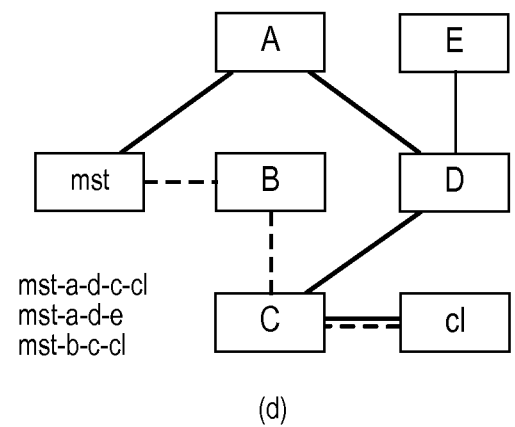

Given election of an mst node, cmp nodes 130 are assigned to carry out the task of object detection. This is shown in FIG. 3 at 318. In some embodiments, the algorithm for electing cmp nodes 130 has the following steps:

Step 1: First, candidate nodes are identified in the network. FIG. 4 shows an example, in which an example network is illustrated in the form of a graph, with the vertices indicating candidate nodes and the edges representing connections between these nodes. In this example network, mst node 120 is directly connected to nodes A and B, and indirectly connected to the others. This might mean, for example, that A and B are in the range of the mst mode's transceiver, while the other nodes are not. In order for the mst node 120 in this example to reach node C, either node B or nodes A and D need to relay its message.

To identify eligible nodes, one approach is to perform a simple graph traversal process from the mst node 120 to all other available nodes in the network. As the network could be quite large, this process could be limited by two factors, in some embodiments:

traversal of a current path in the graph is terminated when the cl node 110 is encountered; and
traversal of the graph is stopped when the number of hops reaches a threshold, such as 5.

Performing this graph traversal process may be performed using simple identification requests that can be transmitted from one node to another by means of broadcasting to all nodes in the area of coverage. Every node responds to the request with at least its identifier, with the response being relayed back to the mst node. The request is further propagated by receiving nodes further down the network. The resulting "walks" of the network are used to identify nodes reachable from the mst node 120 (in the case of a "mst as computation endpoint" configuration") or the cl node 110 (in the case of a "mst as coordinator" configuration), or both.

Step 2: In some embodiments, a first selection process is carried out, to select cmp nodes 130 for carrying out object detection tasks from among the identified candidates. This selection may be based on the reputation index for each of the nodes, as discussed above. In this case, the mst node 120 gathers reputation of all cmp-eligible nodes and chooses the most reputable ones. There can be cases where some physical nodes have not yet assumed a cmp role and therefore no reputation records exist. In this case, selection of eligible cmp nodes 130 is done among those physical nodes where cmp reputation indexes exist and are above an acceptable threshold. If not enough physical nodes with cmp reputation indexes exist or reputation indexes are below a certain threshold, then cmp nodes 130 may be chosen based on their distance from the cl node 110 (e.g. looking at FIG. 4, node C and then B and D would be likely to be chosen first as they are closer to cl node 110). Finally, if all nodes are equal distance, then cmp nodes 130 may be chosen at random from the list of the available nodes.

Returning to FIG. 3, once cmp nodes 130 and the mst node 120 have been selected, the object detection process can start. Object detection can be performed on a per-frame basis or on a per-group-of-frames basis, with different frames or groups of frames being sent to different cmp nodes 130. The decision of splitting frames between nodes may be made by the cl node 110 or the mst node 120, depending on whether the mst is acting as computation coordinator (as in FIG. 1a) or as a computation endpoint (FIG. 1b), respectively.

The basic building blocks of the algorithm are illustrated in FIG. 3, with the signaling 330 corresponding to the "cmp as endpoint" scenario and the signaling 350 corresponding to the "cmp as coordinator" scenario. The cl node 110 sends the raw material, comprising one or more frames or video, to a selected cmp node 130, via the mst node 120 or directly, as shown at 336 and 356. The selected cmp node 130 performs object detection and returns the detected object classes, their position on the frame, as well as a frame identifier, as shown at 338 and 358.

The illustrated procedure may utilize a distributed object detector-tracker algorithm based on the following two assumptions:

First, it may be assumed that updates from an object detector are more reliable than updates from an object tracker, as the latter uses simpler algorithms. However, object trackers are generally much faster than object detectors. As such, object detector frames, as they become available, are used to correct the model and position of the object (or objects) of interest.

Second, the tracker is faster than real time, e.g., able to process more than 60 frames per second. This is in line with current state-of-art trackers, many of which exceed 200 frames per second.

A version of an algorithm for one object class may be described as follows. The parameter θ (theta) denotes the number of frames that a tracker can process between any two consecutive frames of the video sequence (i.e., before it needs to send the next frame for visualization). In the discussion that follows, frame "k" in a sequence of frames is denoted as $f_K$, while $b_K$ refers to a bounding box for a given object class for frame "k", where $b_K==[x_k, y_k, w_k, h_k]$. The bounding box defines a window for the detected location of the object having the given object class. In this example, (x, y) are the center of bounding box and (w, h) it's width and height. Other representations (such as polygons) are also possible.

For every frame $f_K$, the model for tracking objects $M_k$, consists of feature vectors. These vectors are extracted from the previous frame regions representing to the object of interest (i.e., from the bounding boxes returned from previous frames).

A feature vector is of the following format:

$$X = \begin{bmatrix} X_1 \\ X_2 \\ X_d \end{bmatrix}$$

and contains multiple elements about an object, in our case an image region of interest depicting an object class (e.g. "car"). What the elements represent is implementation dependent. For example, in one implementation they can represent raw pixel intensities (usually red-green-black or RGB intensities), in another the mean of each of the color channels, in another color mean and standard deviation, and in another color histograms, which indicate distribution of colors in an image. There can be many of these vectors making up a model, e.g., representations for all previous encounters of the object in previous frames.

In the tracking process, a function T maps previous bounding box for object $B_{k-1}$ to current bounding box $B_k$:

$$B_n = T(f_n, M_n, B_{n-1})$$

The implementation of T uses a vector similarity measure, for example cosine similarity or cross-correlation.

Some embodiments of the presently disclosed techniques may utilize asynchronous communication between the cl node 110 and the cmp nodes 130 providing the object detection service. According to this approach, a number of frames may be tracked while object detection is ongoing. This results in the following handling of frames:

In the event that only tracking information is available for the most recent frame (detection is not available), simply update model with feature vector from last available frame In the event that object detection from previous frame (n-k) is available, where n is current frame and k is the number of tracked frames between the detected frame and current frame:

If k is less or equal to θ (meaning that the tracker can process all k frames before next frame of video sequence or image frame comes in), remove feature vectors $X_{n-1}$, $X_{n-k+1}$ from $M_n$, propagate detected object position from frame $f_{n-k}$ up to $f_n$, and recursively update the model If k is more than θ (meaning that tracker cannot process all k frames before next frame of video sequence or image frame comes in), do a subsampling of the frames, e.g. by iterating the same process as above on every second frame, thus reducing tracker complexity.

Below is described an example of a distributed object detection and tracking algorithm that may be used with the network configurations and procedures described above. This algorithm works by treating every frame independently. A "frame" here means an image, either part of an image stream or extracted from a video stream. Depending on whether the mst node 120 is acting on an endpoint or simply as a computation coordinator, the frame is extracted from a video stream at the mst node 120 or at the cl node 110, respectively. The same holds true with regards to which node is controlling the overall progress of the algorithm. For the purposes of this discussion, the entity that runs the distributed version of detection tracking algorithm is denote as the control entity, or "ce." This could be either the physical node that has the mst role (e.g., where the mst node 120 is an endpoint as in configuration (b) of FIG. 1), or the physical node that has the cl role (e.g., where the mst node 120 is a computation coordinator, as in configuration (a) of FIG. 1).

It is assumed for the sake of this discussion that the ce is already aware of a number of cmp nodes 130 assigned by mst node 120 to this computation, prior to the object detection and tracking process beginning. In some embodiments, each cmp node 130 may be parameterized by at least two parameters:

Its compute capability, denoting how fast can it process an incoming frame for either object detection or object tracking.

Its remaining battery life, if the node uses a renewable source of power.

Figure 5:
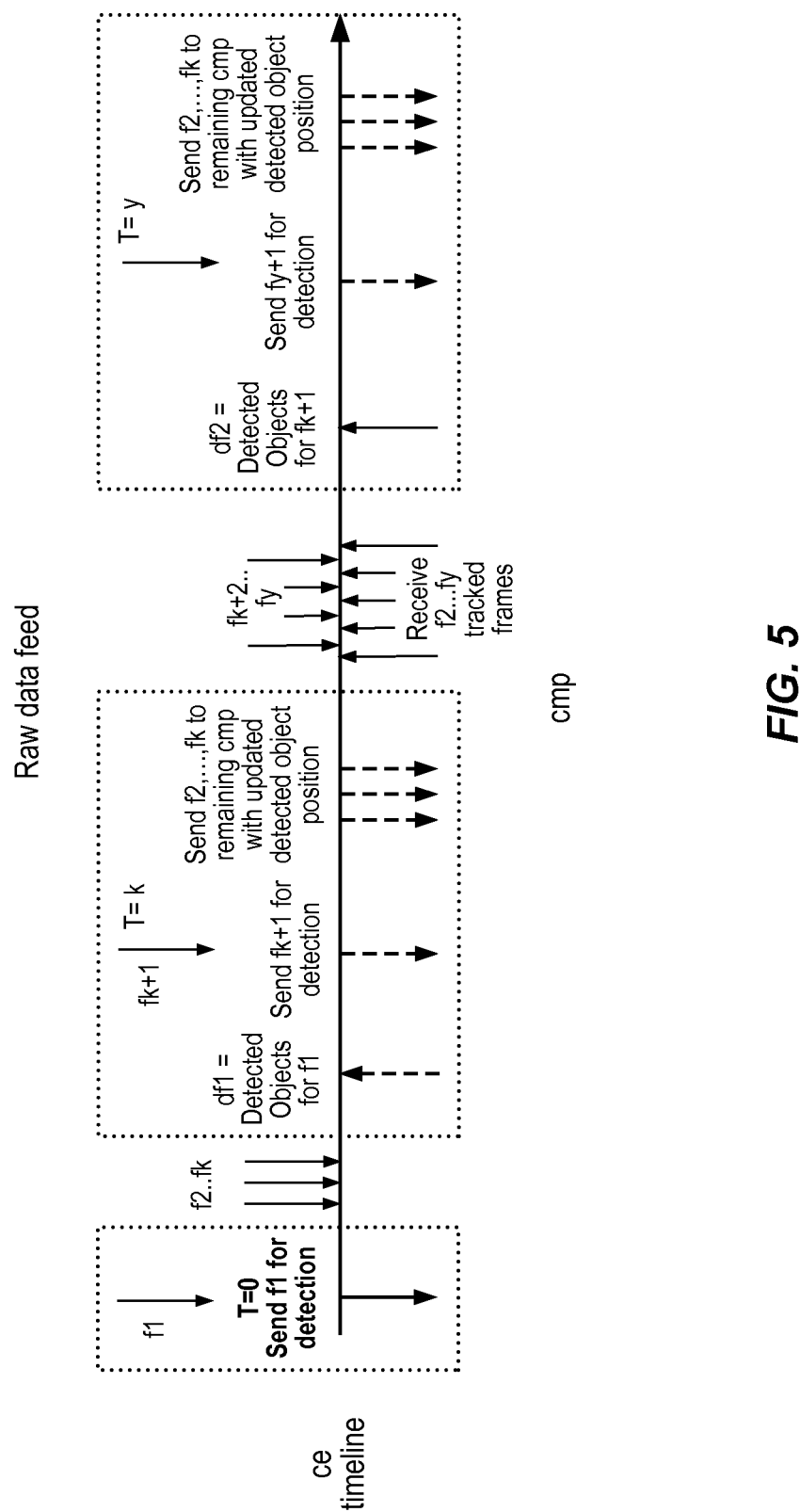
FIG. 5 illustrates an example technique for distributed object detection and tracking.

The process is illustrated in FIG. 5. It begins with the ce selecting one of the eligible cmp nodes 130 (e.g., the cmp nodes 130 selected by the mst node 120 as described above) for object detection of the first incoming frame. This selection is constrained by the above parameters, e.g., so that the node with the best compute capability and/or battery life is selected. There could be a bias in the selection criteria (e.g., 70% compute capability and 30% battery life), so as to reduce the chance that multiple candidates have equal scores.

Before ce receives the results of the very first object detection back it cannot select other cmp nodes 130 for tracking. Selection of tracking nodes, as well as selection of cmp node 130 for detection of the next frame, begins when ce receives the result of the first object detection from the cmp node 130 performing object detection, which is shown as "df1" in FIG. 5. The next frame, $f_{k+1}$, is sent to a cmp node 130 selected for object detection (this cmp node 130 may be the same as or different from the node that performed the first object detection), as shown in FIG. 5. Between this point and receiving the next results of objection detection (at "df2"), the ce node receives a number of frames. These frames are submitted for tracking to remaining cmp nodes 130 among the eligible nodes. The submission of theses frames to the cmp nodes 130 selected for these tracking tasks includes object detection information from the most recently detected frame (e.g., f1, for those), to aid the tracking. Upon completion and receipt of a tracked frame, the updated position of the object may be submitted for the subsequently tracked frames.

This process is described in more detail as follows, from the perspective of the ce node. Let $f_n$ be the current frame in the queue. It is assumed that there at least two eligible cmp nodes 130; in general, there may be many more. Let $C = (<cmp_1, rep\_cmp_1>, <cmp_2, rep\_cmp_2>, \ldots, <cmp_N, rep\_cmp_N>)$ the set of eligible cmp nodes 130. A second set, $C_{tracking}$, stores nodes that are currently tracking frames. For simplicity, it may be assumed that all of the eligible cmp nodes 130, even the resource constrained ones, have at least the capability of tracking one frame before the next frame becomes available.

For each incoming frame $f_n$

If an object detection frame previously sent out for object detection is still being processed (i.e., if ce has not just received object detection information for a previously submitted frame):

Find out how many cmp nodes 130 finished tracking and remove them from $C_{tracking}$;

Re-order tracked frames, as necessary, in the event that tracking results have been received out of order;

Select a cmp node 130 having a highest compute reputation index from $C\backslash\{cmp_x, C_{tracking}\}$, given that it has battery to track more frames. If not, remove the node completely from C and select the next node for tracking, again given that it has battery to track more frames.

Send frame $f_n$ for tracking to the chosen node, and add selected node to $C_{tracking}$.

If object detection frame for frame $f_k$ has just become available to the ce node:

Update model, as described above, and send the updated model to cmp nodes 130, for use in subsequent tracking tasks. This means bringing the model M up to date as of the detected frame $f_k$, so that the most recent detection of object position(s) can be used in subsequent tracking tasks. This updated model may be broadcast to all cmp nodes 130 in C, so that each eligible node has the updated model if needed, or may be submitted to each cmp node 130 as it is selected for a tracking task, along with the raw data to be processed by the cmp node 130.

Select a cmp node 130 having the highest compute reputation index from C (e.g., $cmp_x \in C$) given that it has the battery to detect more frames. If not, the next node may be selected, given that it has battery to detect more frames. Note that if a cmp node 130 is discarded because it has insufficient battery to support a detection task but it still has sufficient battery for tracking, it may be left in C; otherwise, it may be removed from C completely.

Send frame $f_n$ for detection to $cmp_x$. Frame $f_n$ may also be sent to another node for tracking.

In the discussion above, the selection of a mst node 120 for controlling the objection detection and/or tracking tasks was assumed. The use of a mst node 120 is suitable for cases where a device has computational resources and ample power in order to assume the role of the coordinator. This device could be, for example, an Internet of Things (IoT) gateway. There can also be cases where all nodes are the same (e.g., sensor ad-hoc/mesh networks). In such cases, a mst node 120 may be used, as discussed above, but it is also possible to carry out the distributed object detection and tracking tasks without a master node. With this approach, all nodes (from the use cases above) may broadcast to all other nodes at certain time intervals (e.g., every minute and also in response to status changes) their battery status and resources available for detection. In this way all nodes can maintain similar "resource tables" and if one of those nodes becomes a client (has a need to detect visual objects) it uses the table to send a request to the most appropriate node (e.g., the node with the most battery or computational complexity resources). For best performance, the "resource table" should be updated in all other nodes, at the same point in time, to reflect the selection of the node for a detection or tracking task.

Other variations of the techniques described above are possible. Above, an algorithm for distributing computation for object detection and tracking approach in multiple cmp nodes 130 was described in detail. As described, it was assumed that the object detection task for a given frame is assigned to a single cmp node 130. This can have the negative repercussion that the accuracy of detection may degrade in some cases, due to the time between two subsequent object detections, e.g., when there are several objects to be detected in a frame. This degradation may be especially pronounced if the object or objects being tracked are temporarily out of the field of view of the camera. In this case, a tracker will lose the object and probably not find it again until the next object detection frame happens to have the object included.

To reduce the time it takes to process a frame for object detection it is possible to segment the frame into multiple segments, and send the segments for detection to different cmp nodes 130. The selection of the cmp nodes 130 to send the segments may be done using the same procedures for the selection of one cmp node 130 or tracking nodes, as discussed above.

Figure 6:
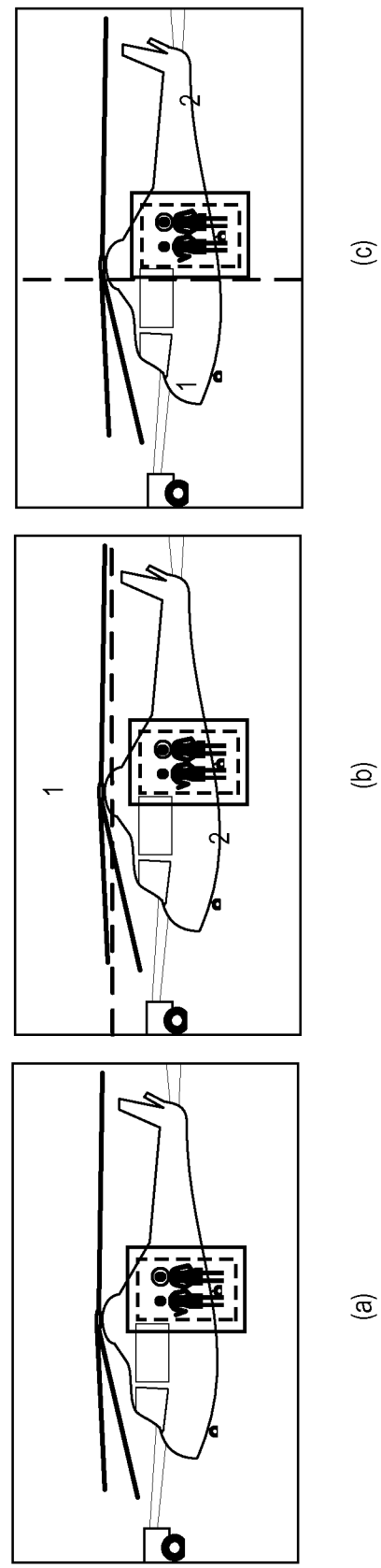
FIG. 6 shows an example of segmenting an image for distributed object detection, according to some embodiments.

FIG. 6 illustrates examples of how a frame might be segmented. The inner bounding box in each illustration, beginning with the unsegmented frame in FIG. 6a, indicates the coordinates of the last tracked frame before a new object detection frame is received, where the new object detection frame should yield a more accurate estimation of where the object is. The outer bounding box is the estimation margin, which is an extrapolation of the inner bounding box. Based on the implementation, this margin can be larger or smaller than what is illustrated here.

Assuming that there are two segments, FIGS. 6b and 6c show two possible methods to segment, based on the horizontal and vertical axis of the yellow bounding box. Horizontal and vertical axes can also be combined to split the image into 3, 4, 5, 6 or more segments, depending on the availability of cmp nodes.

If this segmentation approach is used, the algorithm described above is changed, to reflect that the object detection results for a frame segmented for object detection may arrive at different times. Thus, actions that depend on receiving object detection information for a frame must be delayed until all segments are received. Then, the object detection frame can be reconstructed from the object detection information received for the various segments. Likewise, the algorithm is modified to account for the fact each frame that is to be sent out for object detection must be segmented, and sent to multiple cmp nodes 130, which are selected according to similar procedures to those described above.

Figure 7:
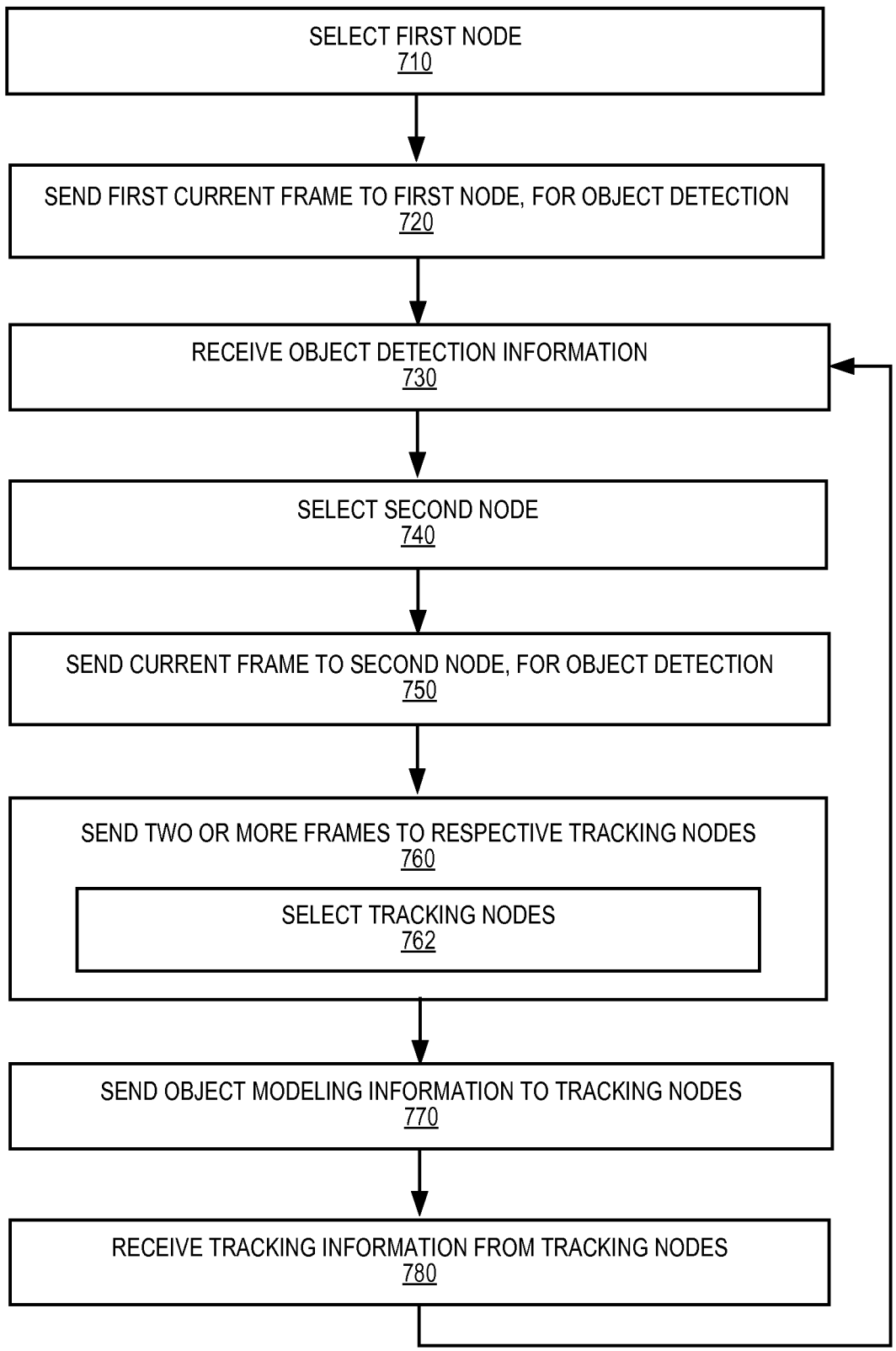
FIG. 7 is a process flow diagram illustrating an example method according to some embodiments.

In view of the detailed examples and alternatives discussed above, it will be appreciated that the process flow diagram of FIG. 7 illustrates a generalized method for tracking a location of an object in a series of frames of a video stream, according to some of the presently disclosed techniques. This method may be implemented by a device acting as a mst node 120 and/or as a control entity, as described above, or by a cl node 110 acting on its own, or by a combination of two or more devices working together. Note that the use of the terms "first," "second," and so on, in the following discussion is not intended to indicate a temporal order or other ordering, but is instead used to distinguish one thing from another like thing.

As shown at block 710, the illustrated method begins with the selection, from a set of two or more nodes available for object detection, a first node. The method continues, as shown at block 720, with the sending of a first current frame from the series of frames to the first node, for detection of at least a first object in the frame. In some embodiments, this first node is selected according to the scoring procedures described above. The sending of the first current frame corresponds to the sending of "raw material" described above, where this raw material may comprise one or more digital images, a portion of a video, or the like. It will be appreciated that the term "frame," as used here, may refer to a portion of a digital image, e.g., in the event that an image is segmented as discussed above.

As shown at block 730, object detection information for the first object is subsequently received back from the first node. (It will be appreciated that several intervening frames may be processed in the meantime—for the sake of simplicity, their handling is omitted from this portion of the illustrated process.) This object detection information includes information classifying and/or locating the first object in the frame previously sent to the first node for the object detection task. Of course, object detection information for more than one object may be received, in some cases.

Once the object detection information is received back from the first node, object tracking for the first object in one or more subsequent frames can be performed, based on the object detection information. In addition, a new frame can be sent out for object detection. Thus, as shown at block 740, the method continues with the selection, from the set of two or more nodes available for object detection, a second node, and sending a second current frame from the series of frames to the second node, for an updated detection of the first object, as shown at block 750. Note that this second node may be selected according to the selection procedures described above and may or may not be the same as the first node.

In addition, as seen at block 760, each of two or more frames following the second current frame are sent to respective tracking nodes. Here, the sending of each frame to a respective tracking node comprises selecting the respective tracking node from a set of two or more nodes available for tracking, as shown at block 762. Furthermore, object modelling information indicating location and/or classification of one or more objects, as derived from the object detection information is sent to each of the respective tracking nodes, as shown at block 770, either along with the sending of the respective frame to each node or separately, e.g., as a broadcast to all eligible nodes. Finally, as shown at block 780, tracking information for the first object is received from each respective tracking for the frame sent to that node. This information can be re-ordered, if necessary to account for any that is received out of order, and processed for rendering/viewing.

The illustrated process can be repeated. Thus, for example, the method can continue, subsequent to sending the two or more frames following the second current frame to respective tracking nodes, receiving updated object detection information for the first object, from the second node (block 730), selecting, from the set of two or more nodes available for object detection, a third node (block 740), sending a third current frame from the series of frames to the third node, for further updated detection of the first object (block 750), and so on.

Thus, for example, subsequent to sending the third current frame to the third node, the method may continue with sending each of two or more frames following the second current frame to respective tracking nodes, where sending each frame to a respective tracking node comprises selecting the respective tracking node from a set of two or more nodes available for tracking (blocks 760 and 762), in which case updated object modelling information derived from the updated object detection information is sent to each of the respective tracking nodes (block 770). The, tracking information for the first object for the frame is received from each of these respective tracking nodes (block 780), with the process continuing as necessary.

In some embodiments, sending each of the two or more frames following the second current frame to respective tracking nodes comprises sending every frame between the second current frame and the third current frame to tracking nodes. In other embodiments, e.g., where not enough nodes are available for tracking or where the tracking resources are otherwise constrained, fewer than all of the intervening frames, such as every second frame, may be sent out for tracking, As noted above, in some embodiments, the sending of object modelling information derived from the object detection information to each of the respective tracking nodes comprises sending the object modelling information to each of the respective tracking nodes along with the respective frame. In others, sending this object modelling information derived from the object detection information to each of the respective tracking nodes comprises sending the object modelling information to all nodes in the set of two or more nodes available for tracking, e.g., via a broadcast or flooding procedure.

In some embodiments, a method like that shown in FIG. 7 may further comprise maintaining a single set of nodes available for either detection or tracking, where this maintaining comprises removing from the set each node selected for detection or tracking while that node performs the respective detection or tracking and returning to the set each node selected for detection and tracking when the node completes its respective detection or tracking. In other embodiments, differing sets of nodes available for detection and tracking, respectively, may be maintained, where this maintaining comprises removing from the respective set each node selected for detection or tracking while that node performs the respective detection or tracking and returning to the respective set each node selected for detection and tracking when the node completes its respective detection or tracking.

In some embodiments, the selecting of a node for object detection is based on one or more metrics for each of the nodes in the set of two or more nodes available for detection, where the one or more metrics include or are based on any of the following: a battery status for the respective node; a measure of processing resources available at the respective node; a count of previous object detection tasks completed by the respective node; and a ratio of objection detection tasks completed by the respective node to a number of object detection tasks assigned to the respective node.

Likewise, in some embodiments, the selecting of a node for object tracking may be based on one or more metrics for each of the nodes in the set of two or more nodes available for tracking, where the one or more metrics include or are based on any of the following: a battery status for the respective node; a measure of processing resources available at the respective node; a count of previous object tracking tasks completed by the respective node; and a ratio of object tracking tasks completed by the respective node to a number of object tracking tasks assigned to the respective node.

Figure 8:
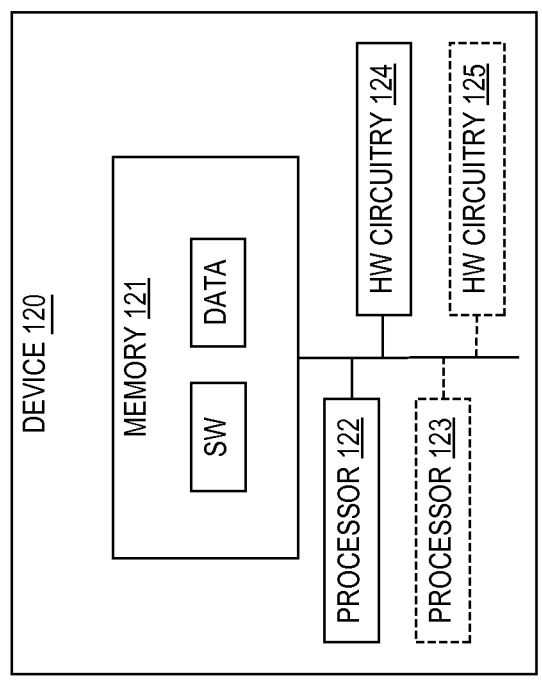
FIG. 8 is a block diagram of an example device according to some of the presently disclosed embodiments.

FIG. 8 is a schematic block diagram illustrating an example of a device 120 based on combination of both processor(s) 122, 123 and hardware circuitry 124, 125 in connection with suitable memory unit(s) 121. The overall functionality is, thus, partitioned between programmed software for execution on one or more processors 122, 123 and one or more pre-configured or possibly reconfigurable hardware circuits 124, 125. The actual hardware-software partitioning can be decided by a system designer based on a number of factors including processing speed, cost of implementation and other requirements. The device 120 may be configured, e.g., with appropriate program code in memory 121 and/or with appropriate configuration of hardware circuits 124, 125, to carry out any of the techniques described herein. Thus, for example, device 120 may be configured to act as a cl node 110, cmp node 130, mst node 120, or ce node, and may in some embodiments be configured to selectively perform any one of several of these roles.

In some embodiments, device 120 is configured, again appropriate program code in memory 121 and/or with appropriate configuration of hardware circuits 124, 125, to carry out all or part of the process flow illustrated in FIG. 7, or variants thereof. In some embodiments, two or more devices like that pictured in FIG. 8 may be configured to cooperate with one another to carry out the method shown in FIG. 7, or variants thereof.

Figure 9:
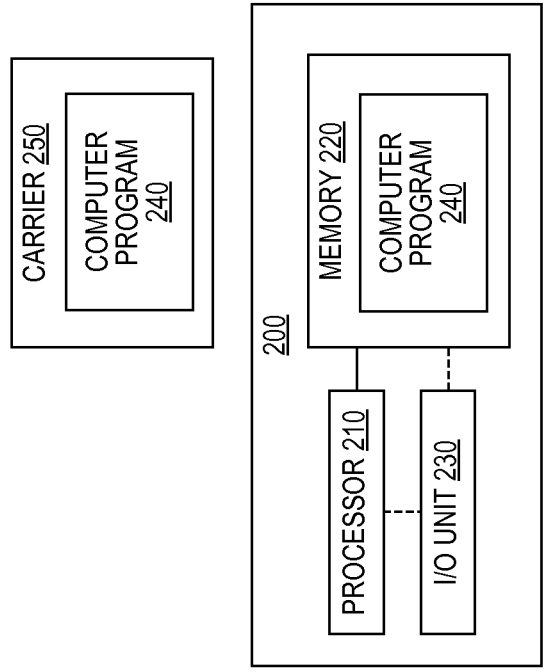
FIG. 9 illustrates a computer program-based implementation, according to some embodiments.

FIG. 9 illustrates a computer program-based implementation according to some embodiments. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to 5 the processor(s) 210 and/or the memory 220 to enable input and/or output of relevant data, such as video frames and detection information.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, that when executed by at least one processor 210, cause the at least one processor 210 to carry out all or some of the steps shown in the process flow of FIG. 7.

The proposed technology also provides a carrier 250 comprising the computer program 240. The carrier 250 is one of an electronic signal, an optical signal, an electromagnetic signal, a magnetic signal, an electric 30 signal, a radio signal, a microwave signal, or a computer-readable storage medium.

By way of example, the software or computer program 240 may be realized as a computer program product, which is normally carried or stored on a computer-readable medium 250, in particular a non-volatile medium.

The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the 5 processing circuitry 210.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Example Program Code

An example implementation of the algorithms described above is shown below in Java. Note that this code does not include an implementation of the segmented object detection described above, which could further increase performance. This implementation encapsulates the algorithm in a test environment, where one can specify the following parameters:

The total number of frames—the assumption is there is no jitter between incoming frames (i.e. frames come every 100 milliseconds).

The total number of CMPs. The reputation index of a CMP is generated randomly as a double between 0 and 1 during runtime.

A coefficient for calculating the total number of frames a CMP is able to track per incoming frame (i.e. every 100 ms) as a product of the CMP's reputation index and this coefficient.

Similarly, a coefficient for calculating the total number of frames a CMP is able to detect.

A battery cost of a single tracking operation. Similarly, battery cost for a single detection operation.

The following parameters were used for CMPs:
CMP[0]   ID:ID_0   Reputation   Index: 0.6256970200371744
CMP[1]   ID:ID_1   Reputation   Index: 0.6584154866876781
CMP[2]   ID:ID_2   Reputation   Index: 0.6305296502731899
CMP[3]   ID:ID_3   Reputation   Index: 0.7541284349836521
CMP[4]   ID:ID_4   Reputation   Index: 0.1208759739305121
CMP[5] ID:ID_5 Reputation Index: 0.765604648894787
CMP[6]   ID:ID_6   Reputation   Index: 0.9255785744225709
CMP[7]   ID:ID_7   Reputation   Index: 0.06024311960588813
CMP[8]   ID:ID_8   Reputation   Index: 0.08155379830196141
CMP[9]   ID:ID_9   Reputation   Index: 0.8405986416587938

With these parameters, the system can do object detection for 1300 frames, before battery was depleted in all 10 CMPs. If on the other hand, a non-distributed client-server model is used (assuming e.g. that the server had a performance index as large as the most capable CMP (0.9255 from the listing above), the process would have ended at frame 265 due to battery depletion of the server.

```
--------------- Begin example code --------------------
package com.research.ericsson;
import java.util.Random;
import java.util.Vector;
/**
 * Master Node Functionality: Computation Distribution
 */
  public class distributedOD {
  private static Vector<cmp> cmpList;
  private static Vector<cmp> trackingCMP;
  private static cmp detectionCMP;
  private static int FRAME_NUMBER = 1300; // Max number of frames to simulate
  private static double OBJECTS_DETECTED_PER_FRAME = 0.2; // reputation index to
object detection relation
```

```
    private static double OBJECTS_TRACKED_PER_FRAME = 8; // reputation index to
object detection relation
    private static double BATTERY_COST_TRACKING_PER_FRAME =0.01; // cost of
tracking to battery life
    private static double BATTERY_COST_DETECTION_PER_FRAME = 0.75; // cost of
detection to battery life
    private static boolean exportStatistics = true;
    private static boolean detectedFirstFrame = false;
    private static Vector<Integer> framebacklog;
    public static void main(String [ ]argv){
        detectionCMP = null;
        cmpList = new Vector<cmp>( );
        trackingCMP = new Vector<cmp>( );
        framebacklog = new Vector<Integer>( );
        for (int i = 0; i < 10; i++){ // Create 10 CMPs
            cmpList.add(new cmp(i));
            //if (!exportStatistics)
                System.out.println(
                    "CMP["+i+"] ID:"+cmpList.get(cmpList.size( ) - 1).cmpID +
                    " Reputation Index: "+cmpList.get(cmpList.size( ) - 1).reputation_index);
        }
        if (exportStatistics){
            System.out.println("I T D");
        }
        for (int frame = 1; frame <= FRAME_NUMBER; frame++){ // For every incoming frame
...
            if (!exportStatistics) System.out.println("\nFrame ID:"+frame);
            int currentFrame = frame;
            if (exportStatistics)
                System.out.print (frame);
            updateCMPdata( ); // ... (a) update processed/tracked frame status of all CMPs
            if (exportStatistics)
                System.out.println("");
            computationDecision(currentFrame); // (b) run detection-tracking distributed algorith
for this frame
        }
    }
    // Algorithm Implementation
    private static void computationDecision(int frameID){
        framebacklog.add(new Integer(frameID));
        assignDetector(frameID);
        assignTrackers(frameID);
        return;
    }
    private static void assignDetector(int frameID){
        if (detectionCMP == null){
            while (cmpList.size( ) > 0) {
                cmp detCmp = getCMPWithLargestRI( );
                if (detCmp.battery_reserve < BATTERY_COST_DETECTION_PER_FRAME) {
                    if (!exportStatistics) System.out.println("\tBattery on CMP " + detCmp.cmpID + "
critically low, not available for detection, removing from list");
                }
                else{
                    detectionCMP = detCmp;
                    detectionCMP.frame_processed = frameID;
                    if (!exportStatistics) System.out.println("\tAssigned Detection CMP: " +
detectionCMP.cmpID);
                    return;
                }
            }
        }
        return;
    }
    private static void assignTrackers (int frameID){
        if (frameID > 1 && detectedFirstFrame) { // First time tracking, we need a frame of
reference
            if (cmpList.size( ) > 0) { // If there are idle trackers, assign one with largest reputation
index to this frame
                while (cmpList.size( ) > 0) {
                    cmp trCmp = getCMPWithLargestRI( );
                    if (trCmp.battery_reserve < BATTERY_COST_TRACKING_PER_FRAME) {
                        if (!exportStatistics) System.out.println("\tBattery on CMP " + trCmp.cmpID +
" critically low, not available for tracking, removing from list"");
                    }
                    else {
                        trCmp.frame_processed = frameID;
                        trackingCMP.add(trCmp);
                        if (!exportStatistics) System.out.println("\tAssigned Tracking CMP: "+
trCmp.cmpID);
```

```
            return;
          }
        }
      }
    }
    return;
  }
  // Update processed frames (detected and tracked)
  private static void updateCMPdata( ){
    Vector<String> cmpToRemove = new Vector<String>( );
    if (trackingCMP != null) {
      for (int i = 0; i < trackingCMP.size( ); i++) {
        trackingCMP.get(i).calculation_index +=
          trackingCMP.get(i).reputation_index *
            OBJECTS_TRACKED_PER_FRAME;
        if (trackingCMP.get(i).calculation_index > 1){
          int trackingCapability = (int) Math.floor(trackingCMP.get(i).calculation_index);
          cmpToRemove.add(new String(trackingCMP.get(i).cmpID));
          cmpList.add(trackingCMP.get(i));
          int backloggedFrames = framebacklog.size( );
          if (trackingCapability <= backloggedFrames){
            trackingCapability = backloggedFrames;
            for (int e = 0; e < backloggedFrames; e++){
              // System.out.print(" T"+trackingCMP.get(i).cmpID+ " " +
framebacklog.elementAt(e) + " ");
            }
            framebacklog.clear( );
          }
          else {
            for (int j = 0; j < trackingCapability; j++){
              if (framebacklog.size( )>0){
                // System.out.print(" T"+trackingCMP.get(i).cmpID+ " " +
framebacklog.elementAt(0) + " ");
                framebacklog.removeElementAt(0);
              }
            }
          }
          if (!exportStatistics)
            System.out.println("\tTracked frame by "+trackingCMP.get(i).cmpID+
"("+trackingCapability+" total)");
          else
            System.out.print ("T "+backloggedFrames);
          trackingCMP.get(i).battery_reserve = trackingCMP.get(i).battery_reserve -
(backloggedFrames * BATTERY_COST_TRACKING_PER_FRAME);
        }
      }
      // Now to remove from tracking list
      for (int i = 0; i < cmpToRemove.size( ); i++){
        for (int k = 0; k < trackingCMP.size( ); k++){
          if (cmpToRemove.get(i).compareTo(
              trackingCMP.get(k).cmpID) == 0){
            trackingCMP.get(k).calculation_index = 0.0;
            trackingCMP.remove(k);
            break;
          }
        }
      }
    }
    if (detectionCMP != null){
      detectionCMP.calculation_index += detectionCMP.reputation_index *
OBJECTS_DETECTED_PER_FRAME;
      detectionCMP.battery_reserve = detectionCMP.battery_reserve -
BATTERY_COST_DETECTION_PER_FRAME;
      if (detectionCMP.calculation_index > 1){
        if (!exportStatistics)
          System.out.println("\tDetected frame by "+detectionCMP.cmpID);
        else
          System.out.print(" 1 ");
        detectionCMP.calculation_index = 0.0;
        cmpList.add(detectionCMP);
        detectedFirstFrame = true;
        detectionCMP = null;
      }
      else if (exportStatistics)
        System.out.print(" 0 ");
    }
  }
  // Get CMP with largest reputation index from the list of active CMPs
  private static cmp getCMPWithLargestRI( ){
```

```
         cmp thisCMP = null;
         int cmpindex = 0;
         for (int i = 0; i < cmpList.size( ); i++){
            if (thisCMP == null){
            thisCMP = cmpList.get(i);
            }
            else{
               cmp currentCMP = cmpList.get(i);
               if (currentCMP.reputation_index > thisCMP.reputation_index){
                  thisCMP = currentCMP;
                  cmpindex = i;
               }
            }
         }
         if (thisCMP != null)
            cmpList.remove(cmpindex);
         return thisCMP;
      }
   }
}
class cmp{
   public cmp(int number){
      Random rand = new Random( );
      cmpID = "ID_"+number;
      reputation_index = rand.nextDouble( );
      calculation_index = 0.0;
      battery_reserve = 100;
      frame_processed = 0;
   }
   public int frame_processed;
   public double calculation_index;
   public double reputation_index;
   public String cmpID;
   public double battery_reserve;
}
--------------- End example code --------------------
```

The embodiments described above are to be understood as a few illustrative examples of the present invention. It will be understood by those skilled in the art that various modifications, combinations and changes may be made to the embodiments without departing from the scope of the present invention. In particular, different partial solutions in the different embodiments can be combined in other configurations, where technically possible. The scope of the present invention is, however, defined by the appended claims.

What is claimed is:

1. A method for tracking a location of an object in a series of frames of a video stream, the method comprising:
   selecting, from a set of two or more nodes available for object detection, a first node;
   sending a first current frame from the series of frames to the first node, for detection of a first object in the frame;
   receiving, from the first node, object detection information for the first object;
   subsequently to receiving the object detection information for the first object from the first node:
      selecting, from the set of two or more nodes available for object detection, a second node, and sending a second current frame from the series of frames to the second node, for an updated detection of the first object;
      sending each of two or more frames following the second current frame to respective tracking nodes for tracking of the first object by the respective tracking nodes, wherein sending each frame to a respective tracking node comprises selecting the respective tracking node from a set of two or more nodes available for tracking and wherein each of the two or more frames is sent to only the selected respective tracking node from among the set;
   sending object modelling information indicating location and/or classification of one or more objects derived from the object detection information to each of the respective tracking nodes; and
   receiving, from each of the respective tracking nodes, tracking information for the first object for the frame sent to the respective tracking node.

2. The method of claim 1, further comprising, subsequently to sending the two or more frames following the second current frame to respective tracking nodes:
   receiving updated object detection information for the first object, from the second node; and
   selecting, from the set of two or more nodes available for object detection, a third node, and sending a third current frame from the series of frames to the third node, for further updated detection of the first object.

3. The method of claim 2, wherein sending each of the two or more frames following the second current frame to respective tracking nodes comprises sending every frame between the second current frame and the third current frame to tracking nodes.

4. The method of claim 2, further comprising, subsequently to sending the third current frame to the third node:
   sending each of two or more frames following the second current frame to respective tracking nodes, wherein sending each frame to a respective tracking node comprises selecting the respective tracking node from a set of two or more nodes available for tracking;
   sending updated object modelling information derived from the updated object detection information to each of the respective tracking nodes; and receiving, from each of the respective tracking nodes, tracking information for the first object for the frame sent to the respective tracking node.

5. The method of claim 1, wherein sending object modelling information indicating location and/or classification of one or more objects derived from the object detection information to each of the respective tracking nodes comprises sending the object modelling information to each of the respective tracking nodes along with the respective frame.

6. The method of claim 1, wherein sending object modelling information indicating location and/or classification of one or more objects derived from the object detection information to each of the respective tracking nodes comprises sending the object modelling information to all nodes in the set of two or more nodes available for tracking.

7. The method of claim 1, wherein the method comprises maintaining a single set of nodes available for either detection or tracking, wherein said maintaining comprises removing from the set each node selected for detection or tracking while that node performs the respective detection or tracking and returning to the set each node selected for detection and tracking when the node completes its respective detection or tracking.

8. The method of claim 1, wherein the method comprises maintaining differing sets of nodes available for detection and tracking, respectively, wherein said maintaining comprises removing from the respective set each node selected for detection or tracking while that node performs the respective detection or tracking and returning to the respective set each node selected for detection and tracking when the node completes its respective detection or tracking.

9. The method of claim 1, wherein each selecting of a node for object detection is based on one or more metrics for each of the nodes in the set of two or more nodes available for detection, wherein the one or more metrics include or are based on any of the following:
- a battery status for the respective node;
- a measure of processing resources available at the respective node;
- a count of previous object detection tasks completed by the respective node; and
- a ratio of objection detection tasks completed by the respective node to a number of object detection tasks assigned to the respective node.

10. The method of claim 1, wherein each selecting of a node for object tracking is based on one or more metrics for each of the nodes in the set of two or more nodes available for tracking, wherein the one or more metrics include or are based on any of the following:
- a battery status for the respective node;
- a measure of processing resources available at the respective node;
- a count of previous object tracking tasks completed by the respective node; and
- a ratio of object tracking tasks completed by the respective node to a number of object tracking tasks assigned to the respective node.

11. A system of one or more nodes, each of the one or more nodes comprising a processing circuit and an associated memory comprising program instructions for execution by the respective processing circuit, the program instructions being configured to track a location of an object in a series of frames of a video stream by:
selecting, from a set of two or more nodes available for object detection, a first node;
sending a first current frame from the series of frames to the first node, for detection of a first object in the frame;
receiving, from the first node, object detection information for the first object;
subsequently to receiving the object detection information for the first object from the first node,
  selecting, from the set of two or more nodes available for object detection, a second node, and sending a second current frame from the series of frames to the second node, for an updated detection of the first object;
sending each of two or more frames following the second current frame to respective tracking nodes for tracking of the first object by the respective tracking nodes, wherein sending each frame to a respective tracking node comprises selecting the respective tracking node from a set of two or more nodes available for tracking and wherein each of the two or more frames is sent to only the selected respective tracking node from among the set;
sending object modelling information indicating location and/or classification of one or more objects derived from the object detection information to each of the respective tracking nodes; and
receiving, from each of the respective tracking nodes, tracking information for the first object for the frame sent to the respective tracking node.

12. The system of claim 11, wherein the program instructions are further configured to cause the nodes to, subsequently to sending the two or more frames following the second current frame to respective tracking nodes:
receive updated object detection information for the first object, from the second node; and
select, from the set of two or more nodes available for object detection, a third node, and sending a third current frame from the series of frames to the third node, for further updated detection of the first object.

13. The system of claim 12, wherein the program instructions are configured so that sending each of the two or more frames following the second current frame to respective tracking nodes comprises sending every frame between the second current frame and the third current frame to tracking nodes.

14. The system of claim 12, wherein the program instructions are further configured to cause the nodes to, subsequently to sending the third current frame to the third node:
send each of two or more frames following the second current frame to respective tracking nodes, wherein sending each frame to a respective tracking node comprises selecting the respective tracking node from a set of two or more nodes available for tracking;
send updated object modelling information derived from the updated object detection information to each of the respective tracking nodes; and
receive, from each of the respective tracking nodes, tracking information for the first object for the frame sent to the respective tracking node.

15. The system of claim 11, wherein the program instructions are configured so that sending object modelling information indicating location and/or classification of one or more objects derived from the object detection information to each of the respective tracking nodes comprises sending the object modelling information to each of the respective tracking nodes along with the respective frame.

16. The system of claim 11, wherein the program instructions are configured so that sending object modelling information indicating location and/or classification of one or more objects derived from the object detection information to each of the respective tracking nodes comprises sending the object modelling information to all nodes in the set of two or more nodes available for tracking.

17. The system of claim 11, wherein the program instructions are further configured to cause the nodes to maintain a single set of nodes available for either detection or tracking, wherein said maintaining comprises removing from the set each node selected for detection or tracking while that node performs the respective detection or tracking and returning to the set each node selected for detection and tracking when the node completes its respective detection or tracking.

18. The system of claim 11, wherein the program instructions are configured so that the nodes maintain differing sets of nodes available for detection and tracking, respectively, wherein said maintaining comprises removing from the respective set each node selected for detection or tracking while that node performs the respective detection or tracking and returning to the respective set each node selected for detection and tracking when the node completes its respective detection or tracking.

19. The system of claim 11, wherein the program instructions are configured so that each selecting of a node for object detection is based on one or more metrics for each of the nodes in the set of two or more nodes available for detection, wherein the one or more metrics include or are based on any of the following:
- a battery status for the respective node;
- a measure of processing resources available at the respective node;
- a count of previous object detection tasks completed by the respective node;
- a ratio of objection detection tasks completed by the respective node to a number of object detection tasks assigned to the respective node.

20. The system of claim 11, wherein the program instructions are configured so that each selecting of a node for object tracking is based on one or more metrics for each of the nodes in the set of two or more nodes available for tracking, wherein the one or more metrics include or are based on any of the following:
- a battery status for the respective node;
- a measure of processing resources available at the respective node;
- a count of previous object tracking tasks completed by the respective node;
- a ratio of object tracking tasks completed by the respective node to a number of object tracking tasks assigned to the respective node.

* * * * *